UNITED STATES PATENT OFFICE.

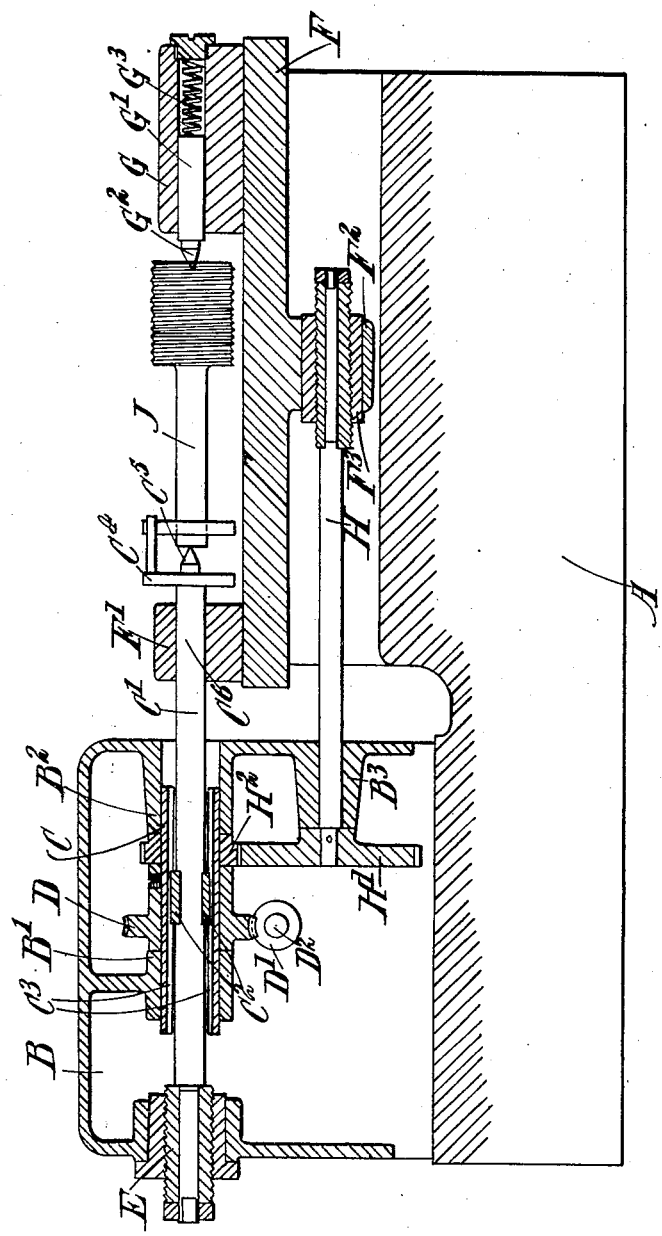

PERCY VENABLES VERNON, OF COVENTRY, ENGLAND.

LATHE OR LIKE MACHINE.

1,339,836.      Specification of Letters Patent.      Patented May 11, 1920.

Application filed November 30, 1918. Serial No. 264,871.

*To all whom it may concern:*

Be it known that I, PERCY VENABLES VERNON, a subject of the King of England, residing at Coventry, Warwickshire, England, have invented certain new and useful Improvements in Lathes or like Machines, of which the following is a specification.

My invention relates to improvements in grinding machines or lathes for cutting or grinding screws or screw thread gages, of the type in which an accurately screw-threaded leader on the headstock spindle engages a fixed nut, and means are employed to rotate the said spindle whereby the screw-threaded leader is caused to travel in the said nut and move the spindle endwise, while the work is held up to and follows the spindle owing to the pressure exerted by the tail-stock center which may be spring pressed from the tail-stock. The leader is of the same pitch as the thread to be ground or cut, so that a grinding wheel or tool held stationary relatively to the endwise movement of the work can reproduce an accurate thread on the work. It is obvious that when using apparatus of this kind, the extent to which the head-stock spindle and the tail-stock center project from their bearings varies during the travel of the leader in its nut; and consequently the work is not uniformly rigid (relatively to side pressure) during the whole of the said travel. It is the object of my invention to remedy this defect.

According to my invention there is combined with a lathe or grinding machine of the type described a traveling front bearing for the headstock spindle and means (for example a lead screw) operatively connected to the main driving mechanism for imparting motion to the said bearing in the direction of endwise movement of the headstock spindle and at approximately the same speed. In this manner the overhanging end of the headstock spindle is supported against side pressure notwithstanding the amount which it projects from the headstock spindle bearings during its endwise movement.

Preferably the tailstock spindle is also operatively connected to the main driving mechanism to move in the direction of endwise movement of the headstock spindle and at approximately the same speed. By this construction the tailstock moves endwise with the work which it supports so that the overhang of the tailstock spindle is not substantially affected by the endwise movement aforesaid.

The tailstock and the front bearing may both be mounted upon a table, longitudinally slidable on the bed of the machine and operatively connected to the main driving mechanism, with or without means for adjusting the endwise positions of the bearing and tailstock thereon.

In the accompanying drawing which illustrates one method of carrying out my invention the bed A of the machine is provided with a headstock B whose main bearings $B^1$ $B^2$ carry a rotatable sleeve C to which is secured a worm wheel D operatively engaged by the driving worm $D^1$ mounted on the drive shaft $D^2$. The sleeve C carries the headstock spindle $C^1$ which is slidable endwise therein, but is prevented relative rotation thereto by feathers $C^2$ which engage longitudinal featherways $C^3$ in the sleeve C. A catch plate $C^4$, or other known driving device for the work and a center $C^5$ are carried on the forward end of the spindle $C^1$, and at its rear end is the usual screw-threaded leader E.

Mounted in any appropriate manner to slide longitudinally upon the machine bed A is a table F, which, at the end nearest the headstock, carries a bearing $F^1$ to support the overhanging portion $C^6$ of the headstock spindle $C^1$, and at the other end carries a tailstock G of known construction. The tailstock spindle $G^1$ with its center $G^2$ is resiliently thrust outward by a spring $G^3$ to maintain a continuous end pressure upon the work held between the centers $G^2$ $C^5$ and thereby also upon the headstock spindle $C^1$ and the leader E.

Carried by a lug $F^2$ on the underside of the table F is a nut $F^3$ which operatively engages the thread of a lead-screw H, whose axis is parallel to that of the headstock spindle $C^1$. One end of the lead-screw is carried by a bearing $B^3$ depending from the headstock B and is provided with a spur wheel $H^1$ which meshes with another spur wheel $H^2$ fast on the sleeve C. The pitch of the lead screw H in conjunction with the proportions of the spur wheels $H^1$ $H^2$ are so chosen that the longitudinal movement of the table F shall be in the same direction, and of the same, or approximately the same amount as the endwise movement of the spindle $C^1$ under the action of the leader E.

It will be seen that by the above described construction work such as J placed between the centers C⁵ and G² will, if the travel of the table F is at the same rate as the endwise movement of the headstock spindle C¹ preserve its same relative position between the bearing F¹ and the tailstock G and thus be supported in a uniform manner against the lateral thrust of the cutting tool, (not shown in the drawing) which is carried upon a stationary part of the machine in known manner.

When a leader is employed having a pitch of thread which causes a slight difference between the rate of endwise movement of the headstock spindle C¹ and that of the table F the spring G³ resiliently presses the tailstock spindle G¹ on the work J, and permits its endwise movement relative to the tailstock G while the headstock spindle slides in the bearing F¹, but unless the thread to be cut on the work is of considerable length the amount of overhang of the headstock spindle C¹ or the tailstock spindle G¹ is not seriously affected. Where a considerable range of pitches have to be cut which involve large difference in the motions of the headstock spindle and the table, change-wheels may be provided between the lead-screw H and its driving wheel H².

When the leader on the headstock spindle has a fine thread, it may be advantageous to make the pitch of the lead-screw H somewhat coarser, and to drive it at a correspondingly reduced speed.

It will be seen that by the employment of the lead-screw H to move the bearing F¹ and the tailstock G and by causing their movement to be in the same direction and of the same amount as that of the endwise movement of the headstock spindle C¹, the main leader and its nut are relieved of all load except that imposed by the cutting tool in forming the thread on the work J. Even if the aforesaid movements are not quite alike the only result is to cause variations of negligible value in the pressure of the spring G³ as the tailstock spindle G¹ moves in the tailstock to compensate for such difference of movements.

To provide for cutting right and left handed threads the spindle of the lead-screw H may be formed to receive interchangeable leaders H³ secured thereon in known manner to engage corresponding nuts F³ carried by the lug F² of the table F. Such interchangeable leaders are of a pitch proportional to that of the main leader E.

Obviously, if desired, the direction of the travel of the table F may be changed by using a reversing train of wheels to operate the lead-screw H.

What I claim as my invention and desire to secure by Letters Patent is:—

1. In a lathe or grinding machine the combination with a head-stock, a tail-stock and a head-stock spindle, of a traveling front bearing for said spindle, a screw-threaded leader for said spindle, and a lead-screw operatively connected with the main driving mechanism, the arrangement being such that a uniform motion is imparted by said lead-screw to the said bearing in the direction of movement of the said spindle and at practically the same speed, thereby maintaining the same relative position of the work between the said bearing and the said tail-stock.

2. A lathe or grinding machine as specified in claim 1, wherein the tailstock is also operatively connected to the main driving mechanism to move in the direction of endwise movement of the headstock spindle and at approximately the same speed.

3. A lathe or grinding machine as specified in claim 2, wherein the tailstock and the front bearing for the headstock spindle are both mounted upon a table, longitudinally slidable on the bed of the machine and operated by the lead-screw engaging a nut on the said table.

In testimony whereof I have signed my name to this specification in the presence of two subscribing witnesses.

PERCY VENABLES VERNON.

Witnesses:
ROBERT HAWKINS,
EVELYN HULL.